United States Patent [19]

Gravesteijn et al.

[11] Patent Number: 5,019,487
[45] Date of Patent: May 28, 1991

[54] METHOD OF MANUFACTURING A METAL MATRIX AND A MASTER DISC SUITABLE FOR THE MANUFACTURE OF MATRICES

[75] Inventors: Dirk J. Gravesteijn; Josephus M. Wijn; Johannes P. J. G. van Liempd, all of Eindhoven, Netherlands

[73] Assignee: U.S. Philips Corporation, New York, N.Y.

[21] Appl. No.: 329,738

[22] Filed: Mar. 28, 1989

Related U.S. Application Data

[63] Continuation-in-part of Ser. No. 246,584, Sep. 19, 1988, abandoned.

[30] Foreign Application Priority Data

Feb. 11, 1988 [NL] Netherlands ............... 8800335

[51] Int. Cl.$^5$ ............................................. G03F 1/02
[52] U.S. Cl. ................................. 430/322; 430/346; 430/945; 430/14; 346/135.1; 369/275.1; 369/275.4
[58] Field of Search ............... 480/258, 259, 14, 16, 480/320, 321, 322, 324, 275, 346, 945; 346/135.1; 369/275.1, 275.4

[56] References Cited

U.S. PATENT DOCUMENTS

| | | | |
|---|---|---|---|
| 4,371,954 | 2/1983 | Cornet | 369/275 |
| 4,405,994 | 9/1983 | Cornet et al. | 369/275 |
| 4,408,213 | 10/1983 | Bell | 346/135.1 |
| 4,430,659 | 2/1984 | Maffitt et al. | 346/135.1 |
| 4,565,772 | 1/1986 | Takeoka et al. | 430/320 |
| 4,615,969 | 10/1986 | Strand | 430/320 |
| 4,647,947 | 3/1987 | Takeoka et al. | 346/135.1 |
| 4,650,735 | 3/1987 | De Laat | 430/16 |
| 4,673,626 | 6/1987 | Takeda et al. | 430/14 |
| 4,719,615 | 1/1988 | Feyrer et al. | 369/275 |
| 4,845,000 | 4/1989 | Takeoka et al. | 430/421 |
| 4,855,992 | 8/1989 | Ikegawa et al. | 346/135.1 |
| 4,861,699 | 8/1989 | Wijdenes et al. | 430/320 |
| 4,896,314 | 1/1990 | Skiens et al. | 430/945 |
| 4,901,304 | 2/1990 | Lind et al. | 430/945 |
| 4,954,422 | 9/1990 | Lamprecht et al. | 430/945 |
| 4,959,822 | 9/1990 | Pasman et al. | 369/275.1 |
| 4,980,262 | 12/1990 | Thomas et al. | 369/275.1 |

Primary Examiner—Marion E. McCamish
Assistant Examiner—Christopher D. RoDee
Attorney, Agent, or Firm—Norman N. Spain

[57] ABSTRACT

A master disc which is provided on one side with a reflective optical structure and a recording double-layer is exposed to a first laser beam which scans the optical structure and to a second laser beam which is controlled by the first beam, information bits in the form of bulges being formed in the recording layer due to exposure to the second beam, a metal skin being subsequently provided on the recording layer, in which metal skin the surface structure of the recording layer is copied and, finally, the matrix thus obtained being removed from the master disc.

3 Claims, 1 Drawing Sheet

METHOD OF MANUFACTURING A METAL MATRIX AND A MASTER DISC SUITABLE FOR THE MANUFACTURE OF MATRICES

This is a continuation-in-part of application Ser. No. 246,584, filed Sept. 19, 1988, now abandoned.

BACKGROUND OF THE INVENTION

The invention relates to a method of manufacturing a metal matrix which can suitably be used for the manufacture of optically readable synthetic resin information carriers. The manufacture of synthetic resin information carriers can, for example, be carried out by means of a compression moulding or injection moulding process. In these processes, a heated, liquid synthetic resin such as polycarbonate or polymethylmethacrylate is forced into a mould at a raised pressure, which mould comprises one or two of the above-mentioned metal matrices. After the synthetic resin has cooled and solidifed, the information carrier obtained such as a Compact Disc (®) or Laser Vision Disc (®) is removed from the mould. One or both surfaces of the synthetic resin information carrier is or are provided with an optically readable structure which is a copy of the optical structure of the matrix or matrices.

In the customary method of manufacturing a metal matrix, a master disc is used which consists of a glass plate which is provided on one side with a layer of a positive photoresist. On the side of the photoresist layer, the master disc is exposed to laser light which is modulated in conformity with the information to be recorded. In a subsequent developing step the exposed parts of the photoresist layer are removed so that information bits, hereinafter also termed effects, are formed. Subsequently, a metal layer such as an Ag layer is applied to the developed photoresist layer by means of an electroless deposition process such as a vapour-deposition process, a sputtering process or a chemical plating process. A further metal layer such as an Ni layer is applied to the metal layer by electrodeposition. After the master disc has been removed a metal matrix (father disc) is obtained whose optical structure is a copy of the structure of the exposed and developed photoresist layer. Additional metal copies of the father disc can be manufactured by means of electrodeposition. These copies are called mother and son matrices. The latter matrices are ofter employed in the above-mentioned manufacture of synthetic resin information carriers.

Since the master disc is a product from which a number of matrices and, subsequently, many thousands of synthetic resin information carriers are derived, it has to meet very high quality requirements. The above-mentioned effects are arranged in a spiral-shaped track. The width of the effects amounts to approximately 0.5 $\mu$m. The distance between the turns of the track, i.e. the track pitch, is 1.6 $\mu$m. The length of the effects varies from approximately 0.9 to 3.6 $\mu$m. The length of the effects determines the information recorded. On using an EFM (eight out of fourteen modulation) signal, the length of the effects must vary, as stated above, in discrete steps of 0.3 $\mu$m between the smallest (0.9) and the largest (3.6) length dimension. This means that it must be possible to provide and, moreover, detect optically and distinguish effects having length dimensions of 0.9; 1.2; 1.5; 1.8; 2.1; 2.4; 2.7; 3.0; 3.3; and 3.6 $\mu$m.

Owing to this, high demands are imposed on the mechanical accuracy with which the information track is provided. This requires the use of expensive equipment comprising laser measuring systems and air cushion supporting means.

SUMMARY OF THE INVENTION

It is an object of the invention to provide a method of manufacturing a metal matrix, which does not require the use of expensive equipment. Another object is to provide a method of manufacturing a metal matrix, in which the master disc no longer has to be developed after it has been exposed to light. Thus, a considerable simplification of the method is obtained.

These objects are achieved by a method of the type described in the opening paragraph, which is characterized in that a substrate plate is provided on one side with a reflective optical structure and a recording layer, the recording layer comprising a synthetic resin double-layer having an expansion layer facing the substrate plate and a retention layer connected thereto, the optically reflective structure being provided at the interface of the substrate plate and expansion layer or at the interface of the expansion layer and retention layer or at the interface of air and the retention layer, the optical structure of the master disc thus obtained being scanned by a first continuous, laser light beam, the recording layer being exposed to a second laser light beam which is controlled by the first beam and pulsated in conformity with the information to be recorded, information bits being formed in the recording layer due to the exposure, the recording layer being provided with a metal skin and the metal matrix thus obtained, in which the surface structure of the recording layer is copied, being removed from the recording layer.

Figure 1:
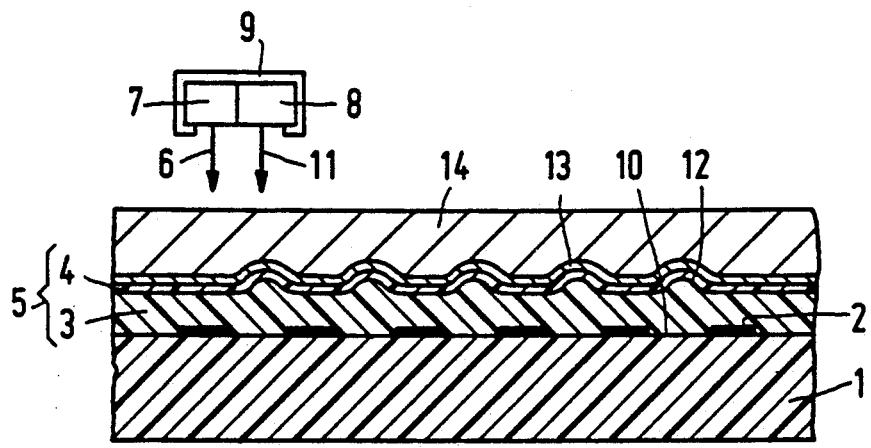
FIG. 1 is a cross-sectional view of a preferred embodiment of a master disc according to the invention, used in a method according to the invention.

In a favorable embodiment of the method, the reflective optical structure is a groove structure carrying a reflection layer, which is scanned and followed on the basis of phase differences with the non-grooved surroundings. The groove is mostly spiral-shaped and has a depth of $\lambda/8$ n, wherein $\lambda$ is the wavelength of the laser light by which the groove is scanned and n the refractive index of the material in which the groove is formed. The depth amounts to, for example, 60 nm. With such a depth the path-length difference between a laser beam reflected in the groove and a laser beam reflected by the surrounding of the groove is $\frac{1}{4}\lambda$ and the phase difference is 180°. The width of the groove is approximately 0.6 $\mu$m. The distance between the turns of the groove is approximately 1.6 $\mu$m.

It is alternatively possible to use a so-called amplitude structure instead of this groove or phase structure. Such an amplitude structure is obtained by providing on a flat surface, such as the surface of the substrate, a sprial-shaped path of a material having a different reflective power for the laser light used than the surface. An example of this is a spiral-shaped path which consists of a metal which has been applied to a substrate of synthetic resin or glass by means of vapor deposition or sputtering.

In an efficacious embodiment of the method according to the invention, a plastic substrate plate of, for example, polycarbonate or polymethylmethacrylate is used in which a groove is formed, or a glass substrate plate is used which is provided on one side with a light-cured snythetic resin layer in which the above-said groove is formed. The synthetic resin layer in which the groove is formed is coated with a metal layer, such as Al layer, which is provided by vapor deposiiton and on which the recording layer is provided.

In a further preferred embodiment of the method according to the invention, the effects are recorded in the parts of the recording layer situated between the grooves. These parts are also called land parts.

Due to the above-described coupling of the modulated write laser beam to the continuous laser beam which is focussed to the follower track, the writing beam is positioned exactly on the master disc. Thus, a laser measuring system and an air cushion supporting means, as applied in the known method for the manufacture of matrices, are superfluous.

The effects recorded in the recording layer can be read immediately by means of laser light. Thus, it becomes possible to optimize tracking and the read signal in a test strip of the master disc, in particular by adjusting the write energy. In this way, the effects can be optimally recorded in the recording layer of the master disc, as a result of which the ultimately produced metal matrix is of a high quality. Besides, for the manufacture of the matrix only one master disc is necessary. If a phtoresist is used, as described above, the quality cannot be determined until the entire disc has been exposed and developed. A frequent consequence hereof is that several master discs are necessary to produce one metal matrix of a good quality.

The optical reflective structure may be a phase structure or an amplitude structure, as described above. The follower track formed by this structure is scanned and followed by a continuous laser beam emanating from, for example, an infrared laser such as an AlGaAs laser having an emission wavelength of, for example, 820 nm. Information bits (effects) are recorded in the recording double-layer by means of a laser beam which is pulsated in conformity with the information to be recorded. This write beam emanates from, for example, an $Ar^+$ laser having an emission wavelenght of 458, 488 or 514 nm. The $Ar^+$ laser can readily be coupled mechanically to the AlGaAs laser such that, for example, the light spot of the $Ar^+$ laser on the above-described master disc (substrate plate having an optical structure and a recording layer) is moved in a diametrical direction over a distance equal to the track pitchi or half the track pitch relative to the light spot of the AlGaAs laser. The track pitch is the distance between successive turns of the follower track (groove). In the exposed areas of the recording layer, the effects are recorded in the form of bulges which can be read directly on the baiss of phase differences with the environment of the bulges by means of a continuous laser beam emanating from, for example, a He—Ne laser having an emission wavelength of 633 nm. Subsequently, the recording layer is provided with a metal layer in an elecltroless deposition procoess and, subsequently, with a further metal layer which is provided by means of electrodeposition. The surface structure of the metal matrix thus obtained is a copy of the structure of the recording layer.

The expansion layer facing the substrate plate has a relatively high coefficient of expansion and a glass transition temperature (Tg) which is below room temperature. The retention layer connected to the expansion layer has a relatively low coefficient of expansion and a glass transition temperature which is above room temperature. The expansion layer, hereinafter also termed underlayer, preferably has a cross-link structure with a relatively high cross-link density so that on expansion an elastic and no plastic deformation takes place. The material of the expansion layer is, preferably, an elastomer such as a natural or synthetic rubber. A suitable material yielding good results is a polyurethane elastomer.

The material of the retention layer, hereinafter also termed top layer, is vitreous at room temperature. At temperatures above the transition temperature (Tg) the material is rubberlike. It has a relatively low modulus of elasicity. Suitable synthetic resins for the top layer are cross-linked polymers having a relatively low cross-link density such as cross-linked polystyrene, polycarbonate, polyacrylates, polymethacrylates, and resins such as silicone resins, alkyd resins and epoxy resins. A very suitable material is a cross-linked epoxy resin.

Both the expansion layer and the retention layer are provided with a dye which absorbs the write laser light. Preferably, the same dye stuff is used in the expansion layer and in the retention layer. The quantity of dye amounts to between 1 and 15% by weight. Suitable dyes for absorbing the laser light of the $Ar^+$ laser are listed in the Colour Index (CI) such as, in particular, C.I Solvent Red colorants. Very suitable dyes are C. I. Solvent Red 92 (Savinyl Scarlet ®) and C.I. Solvent Red 26.

Due to exposure to modulated write laser light, the temperature rises in both the top layer and the underlayer to values which substantially exceed the transition temperature of the top layer. The material of the underlayer is subject to a high degree of expansion, thereby forcing up the material of the top layer, which has a low degree of expansion, so that a bulge is formed. On cooling, the temperature of the top layer decreases to below the glass transition point so that this layer becomes rigid. The underlayer is still in a heated and expanded condition. On further cooling, the underlayer, which is fixed by the top layer, cannot shrink any further. The recorded effect (bulge) remains in tact. During the write process, the master disc is rotated at 3–10 Hz, while the laser beam moves diametrically across the disc. The length dimension of the effect can be varied by varying the exposure time, length dimensions from 0.9 to 3.6 $\mu m$ (in intermediate steps of 0.3 $\mu m$), which are necessary for, for example, recording EFM-modulated signals, being obtained. The width dimension of the effects remains unchanged or substantially unchanged so that the spiral-shaped information track defined by the effects has a uniform width.

In this respect it is to be noted that an erasable optical recording medium comprising a recording double-layer is known from European Patent Application No. 0.136.070. Different dyes are used in retention layer and expansion layer of the known recording medium, i.e. dyes having a different absorption characteristic. The dye used in the retention layer must not absorb the laser light during the write process, but must absorb it during the erase process. In the expansion layer it is the other way round. The dye applied in the expansion layer absorbs the write laser light and is transparent to the laser light used in the erase process. The above-mentioned European Patent Application does not say or suggest that the recording medium can be used as a master disc for the manufacture of matrices. Tests carried out by Applicants on the known recording medium, the top layer being transparent or substantially transparent to the write laser light used, have shown that this medium is not suitable for the above-said application because if the length dimension of the recorded effects (bulges) varies the width dimension varies also so that no information track having a uniform width is obtained. In a mastering process for the manufacture of matrices this is not permissible.

In a further suitable embodiment of the method according to the invention, the reflective optical structure is a groove structure to which a reflection layer is applied, and which is provided at the interface of substrate plate and expansion layer. The reflection layer may have a high reflective power, the reflection being from 80–100%. A reflection layer having a low reflective power such as 5–20% may alternatively be used.

In another suitable embodiment, the reflective optical structure is a groove structure to which a reflection layer is applied and which is provided at the interface of expansion layer and retention layer or at the interface of air and retention layer. Preferably, the reflection layer has a low reflective power of, for example, 5–20%. This low degree of reflection is desirable so as to ensure that sufficient laser light is absorbed in both layers of the recording layer.

The invention also relates to a master disc which is suitable for the manufacture of matrices which in turn are used in the manufacture of optically readable information carries, the master disc comprising a substrate plate which is provided on one side with a recording double-layer in which information bits in the form of bulges can be recorded by exposure to a modulated laser beam, the recording double-layer comprising an expansion layer facing the substrate, and a retention layer connected thereto, an optically readable, reflective structure which forms a follower track for positioning the laser beam being provided at the interface of substrate plate and expansion layer or at the interfce of expansion layer and retention layer or at the interface of retention layer and air.

The invention will now be explained in greater detail by reference to the figures of the drawing.

In FIG. 1, reference numeral 1 refers to a synthetic resin substrate of polycarbonate. Substrate plate 1 is provided on one side with a spiral-shaped path 2 of Al which has been provided by vapour deposition and which has a reflection of 15%. Instead of a metal such as Al a colorant may alternatively be used.

An expansionn layer 3 is applied to plate 1. The layer 3 comprises a cross-linked urethane elastomer which is commercially available under the trade name Solithane 113, wherein 8% by weight of the dye savinyl scarlet is finely dispersed or dissolved. The layer 3 is manufactured in a spin-coating process in which a solution of the not cross-linked polyurethane in an organic solvent to which the dye is added is provided in the center of the substrate plate 1. Subsequently, the substrate plate 1 is rotated so that the solution is uniformly distributed over the surface of the plate 1 and, simultaneously, the solvent is evaporated. Then, the layer obtained in cured by heating or exposure to light such as UV light. A retention layer 4 is applied, also by means of spin-coating, to the expansion layer 3. The layer 4 comprises a weakly cross-linked epoxy resin in which 8% by weight of the dye savinyl scarlet is dissolved or finely dispersed. The layers 3 and 4 together form the recording double-layer 5.

The master disc 1–5 thus obtained is exposed to a laser beam 6 emanating from an AlGaAs laser 7. Beam 6 is focussed on the spiral-shaped track 2. The emission wavelength of the AlGaAs laser is approximately 820 nm. The master disc 1–5 is rotated at a rate of 3–10Hz. The laser 7 is moved in a radial direction relative to the master disc. In this process, the laser 7 follows the follower track 2 on the basis of reflection differences of the track relative to the environment of the track where there is no reflection layer. An argon ($Ar^+$) laser 8 having an emission wavelength of 458, 488 or 514 nm is coupled to laser 7, for example by fixing both layers relative to each other in a common housing 9. In this process, the laser 8 is moved in a radial direction (seen from the master disc 1–5) relative to the laser 7 over a distance equal to half the joint width of track 2 and track pitch 10. The track pitch 10 is the distance between the turns of the spiral-shaped track 2. The laser beam 11 emanating from the laser 8 is focussed on the recording double-layer 5, the spot size of the beam being from 0.1–1 μm. The laser beam 11 is modulated according to EFM. During the recording of information the disc is rotated at the said rate of 3–10 Hz, while the laser beam 11 is moved diametrically across the disc. Due to this, a spiral-shaped track of bits 12 is formed. In the exposed areas the light energy is converted into heat both in the expansion layer 3 and the retention layer 4. In both layers the temperature rises to values substantially exceeding the glass transition temperature of layer 4. Due to the temperature increase the layers 3 and 4 expand, the expansion of layer 3 exceeding that of layer 4 due to the high coefficient of thermal expansion. Thus, additional bulging (stretching) of the layer 4 takes place as a result of the strongly expanding layer 3. However, no or hardly any plastic deformation takes place. The stretching remains within the elastic limit. An information bit in the form of a bulge 12 is formed. On cooling, the temperature of the retention layer 4 decreases to below the glass transition temperature so that the layer becomes rigid and further deformation becomes impossible. The underlayer is still in an expanded condition. Consequently, the information bit 12 does not disappear.

The length dimension of the bit varies from 0.9 to 6.0 μm with intermediate steps of 0.2 μm. The length of the bit is determined by the exposure time which varies, for example, from 0.25 μs to 5 μs. The power of the laser used is, for example, from 1 mW to 15 mW on the disc. All bit have the same width dimension of approximately 0.6 μm. The track width and, hence, the track pitch are excellently defined.

After the bits have been formed a metal layer 13 of, for example, Ag is applied by vapor deposition. An Ni skin 14 is applied thereto by means of electrodeposition. Finally, the metal matrix 13, 14 formed is removed from the master disc 1–5.

Figure 2:
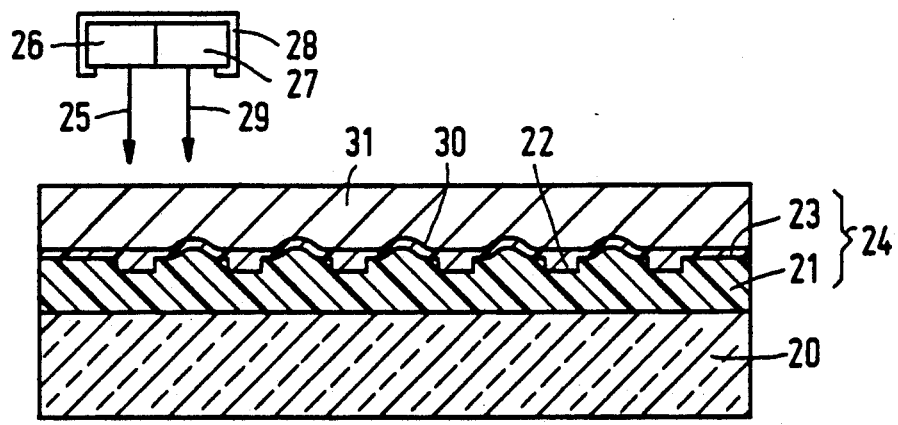
FIG. 2 is a cross-sectional view of another preferred embodiment of a master disc according to the invention, used in a method according to the invention.

In FIG. 2, reference numeral 20 refers to a glass substrate plate which is provided on one side with an expansion layer 21. Expansion layer 21 corresponds to the expansion layer 3 of FIG. 1. This layer is provided on the free surface with a spiral-shaped groove 22. The groove is provided by means of the matrix whose surface contains a spiral-shaped ridge which forms the negative of the groove 22. A layer of a solution of a polyurethane in an organic solvent is applied to the surface of the matrix, to which solution a dye is added.

Upon evaporation of the solvent, the substrate plate 20 is placed on the polyurethane layer. Subsequently, the polyurethane synthetic resin is cured by exposing it to light such as UV light or by heating, in which process the polymer molecules are cross-linked. Finally, the substrate plate and the cured polyurethane layer connected thereto, the surface of which is a copy of that of the matrix, is removed from the matrix.

The surface of the expansion layer 21 in which the groove 22 is formed is subsequently provided with a layer of Al, not shown, which is provided by means of vapor deposition and which has a reflection of 15%. Retention layer 23 is provided on top of the set layer. The retention layer 23 corresponds to the retention layer 4, as shown in FIG. 1. Expansion layer 21 and retention layer 23 together form the recording double layer 24. The laser beam 25 emanating from an AlGaAs laser 26 is focussed on the groove structure 22. The AlGaAs laser has an emission wavelength of 820 nm. The master disc 20-24 is rotated at a rate of 3-10Hz. The laser beam 25 is moved diametrically across the disc surface. In this process, the laser beam 25 follows the groove 22 on the basis of phase differences between the laser light reflected by the groove and the laser light reflected by the environment of the groove. Thus, the positioning of the laser beam is determined by the groove 22. In contrast with conventional mastering and production of metal matrices, the present method requires no laser measuring system and air cushion supporting means. Laser 26 is coupled to an Ar+ laser 27 so that the movement of laser 26 is also imposed upon laser 27. To this end, laser 26 and laser 27 are accommodated in a common housing 28. Relative to laser beam 25, beam 29 emanating from laser 27 is moved in a radial direction relative to the disc over a distance equal to half the joint width of groove 22 and the groove pitch between the groove turns.

Laser beam 29 is modulated in conformity with the information to be recorded. In the exposed areas of the recording double-layer 25 information bits are formed in the form of bulges 30 having different length dimensions in conformity with the information recorded and having the same of substantially the same width dimension. The formation of bulges 30 corresponds to the formation of bits 12, as described with respect to FIG. 1. The bits or bulges 30 can be immediately be read optically by means of a He—Ne laser, not shown, on the basis of phase differences of the light reflected by the bits. The data obtained can be used immediately to check and, if desired, adjust the writing process.

After the bits have been provided, a metal layer, not shown, such as an Ag layer is provided on retention layer 23 by means of vapor deposition. An Ni layer 31 is applied to this layer by means of electrodeposition. Finally, the metal matrix obtained and consisting of the Ag layer and the nickel layer 30 is removed from the master 20-24.

We claim:

1. Method of manufacturing a metal matrix particularly adapted for the manufacture of optically readable synthetic resin information carriers, characterized in that a substrate plate is provided on one side with a reflective optical structure and a recording layer, the recording layer comprises a synthetic resin double-layer having an expansion layer facing the substrate plate and a retention layer positioned on the side of the expansion layer away from the substrate, an optically reflective structure is provided at the interface of the substrate plate and the expansion layer or at the interface of the expansion layer and said retention layer or at the interface of air and said retention layer thereby forming a master disc, the optical structure of the master disc thus obtained is scanned by a continuous, first laser light beam, the recording layer is exposed to a second laser light beam which is controlled by the first beam and pulsated in a conformity with information to be recorded, information bits being thus formed in the recording layer due to the exposure to said second laser light beam, the recording layer is then provided with a metal skin and the metal skin, in which the surface structure of the recording layer is copied, is removed from the recording layer thus forming the metal matrix.

2. A method of claim 1 wherein the reflective optical structure is a structure provided with grooves and with a reflective layer which grooves are scanned and followed on the basis of phase differences with the portions of the structure surrounding the grooves.

3. A method as claimed in claim 5, characterized in that the information bits are formed in the parts of the recording layer situated between the grooves.

* * * * *